United States Patent
Froidcoeur et al.

(10) Patent No.: US 10,560,278 B2
(45) Date of Patent: Feb. 11, 2020

(54) EMBEDDING A UPNP AV MEDIASERVER OBJECT ID IN A URI

(75) Inventors: Tim Froidcoeur, Leuven (BE); Marc Simon Remy Masschelein, Leuven (BE); Stefaan Motte, Leuven (BE); Daniel Meirsman, Sunnyvale, CA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 4394 days.

(21) Appl. No.: 10/562,872

(22) PCT Filed: Jun. 28, 2004

(86) PCT No.: PCT/IB2004/051026
§ 371 (c)(1),
(2), (4) Date: Dec. 29, 2005

(87) PCT Pub. No.: WO2005/002139
PCT Pub. Date: Jan. 6, 2005

(65) Prior Publication Data
US 2006/0184851 A1    Aug. 17, 2006

(30) Foreign Application Priority Data
Jun. 30, 2003    (EP) .................................... 03101949

(51) Int. Cl.
*H04L 12/28*    (2006.01)
(52) U.S. Cl.
CPC ................ *H04L 12/2803* (2013.01)
(58) Field of Classification Search
USPC ....... 709/201, 203, 204, 219, 220, 224, 225; 370/260
See application file for complete search history.

(56) References Cited

U.S. PATENT DOCUMENTS

| | | | |
|---|---|---|---|
| 6,892,230 B1 * | 5/2005 | Gu et al. ...................... | 709/220 |
| 7,065,574 B1 * | 6/2006 | Saulpaugh et al. ........... | 709/225 |
| 7,447,740 B2 * | 11/2008 | AbiEzzi et al. ............. | 709/204 |
| 7,454,511 B2 * | 11/2008 | Weast .......................... | 709/231 |
| 8,321,897 B2 | 11/2012 | Sato et al. | |
| 2002/0035621 A1 | 3/2002 | Zintel et al. | |
| 2002/0112180 A1 * | 8/2002 | Land et al. .................. | 713/200 |
| 2002/0124262 A1 | 10/2002 | Matsushita | |
| 2003/0177270 A1 | 9/2003 | Noda et al. | |
| 2003/0220781 A1 * | 11/2003 | Salmonsen et al. ........... | 703/25 |
| 2004/0030793 A1 | 2/2004 | Noda et al. | |

(Continued)

FOREIGN PATENT DOCUMENTS

| | | |
|---|---|---|
| JP | H11341472 A | 12/1999 |
| JP | 2001356976 A | 12/2001 |

OTHER PUBLICATIONS

Ritchie J, et al: UPnP AV Architecture; 0.83, Preliminary Design TPD, Jun. 2002, pp. 1-22.

(Continued)

*Primary Examiner* — Scott B Christensen

(57) ABSTRACT

A UPnP-compliant MediaRenderer-Control Point combination is enabled to exploit an organizational context of a content item as represented in a UPnP Content Directory Service. To this end, the combination is enabled to receive a URI representative of a Content Directory Service description, together with an objectID representative of the content item.

26 Claims, 1 Drawing Sheet

(56) References Cited

U.S. PATENT DOCUMENTS

2004/0088731 A1* 5/2004 Putterman et al. ............. 725/94
2004/0243700 A1* 12/2004 Weast .......................... 709/224

OTHER PUBLICATIONS

Vol. 6, Issue 04, Publ. Nov. 15, 2002, ISSN 1535-766X; "Intel Technology Journal" Interoperable Home Infrastructure; High-Quality Media Distribution in the Digital Home.
MediaServer:1; Device Template Version 1.01, for Universal Plug and Play Version 1.0, Jun. 25, 2002. John Ritchie.
MediaRenderer:1; Device Template Version 1.01, for Universal Plug and Play Version 1.0, Jun. 25, 2002. John Ritchie.
ConnectionManager:1; Service Template Version 1.01, for Universal Plug and Play Version 1.0, Jun. 25, 2002. Shannon Chan et al.

\* cited by examiner

EMBEDDING A UPNP AV MEDIASERVER OBJECT ID IN A URI

FIELD OF THE INVENTION

The invention relates to a method, control software and an apparatus for use on a UPnP AV network.

BACKGROUND ART

Universal Plug and Play (UPnP) is an industry-wide ongoing development for an open network architecture that is designed to enable simple, ad hoc communication among distributed devices and software applications from multiple vendors. UPnP leverages Internet technology and extends it for use in non-supervised home networks. UPnP aims at controlling home appliances, including home automation, audio/video, printers, smart phones, etc. UPnP distinguishes between Control Points (CPs) and controlled devices (CDs). CPs comprise, e.g., browsers running on PCs, wireless pads, etc., that enable a user to access the functionality provided by controlled devices.

UPnP defines protocols for discovery and control of devices by CPs. UPnP does not define a streaming mechanism for use by AudioVideo devices. Some of the discovery and control protocols are part of the UPnP specification while others are separately standardized by the IETF (Internet Engineering Task Force).

Interaction between CPs and devices is based on the Internet protocol (IP). However, UPnP allows non-IP devices to be proxied by a software component running on IP-compliant devices. Such a component, called Controlled Device (CD) proxy, is responsible for translation and forwarding of UPnP interactions to the proxied device.

A UPnP device has a hierarchy of sub-devices with at the lowest level services. Both devices and services have standardized types. A device type determines the sub-devices or services that it is allowed to contain. A service type defines actions and state variables that a service is allowed to contain. State variables model the state of the device, actions can be invoked by a CP in order to change that state. The description of the state variables and the actions is called the SCP (Service Control Protocol). A UPnP device provides a description of itself in the form of an XML document. This document contains, among other things, the service types that it supports. Optionally, a device may have a presentation server for direct UI control by a CP.

UPnP relies currently on AutoIP, which provides a means for an IP device to get a unique address in the absence of a DHCP server. UPnP defines a discovery protocol, based on UDP multicast, called SSDP (Simple Service Discovery Protocol). SSDP is based on devices periodically multicasting announcements of the services that they provide. An announcement contains a URL to which service actions are to be sent: the control server. In addition to that, CPs may query the UPnP network for particular device or services types or instances.

UPnP relies on GENA (Generic Event Notification Architecture) to define a state variable subscription and change notification mechanism based on TCP.

After a CP has detected a service it wants to use (via SSDP), it controls the service by sending SCP actions to the control server URL or querying for state variables. Actions are sent using HTTP POST messages. The body of such a message is defined by the SOAP (Simple Object Access Protocol) standard. SOAP defines a remote procedure call mechanism based on XML.

The UPnP AV (audio/video) specification relates to interaction between UPnP AV devices, e.g., TV sets, video recorders, DVD players, settop boxes (STBs), PCs, etc., and the associated CPs. The UPnP AV specification defines a MediaServer device and MediaRenderer device and their services. A MediaServer (MS) on the network stores AV content and exposes it to other devices on the network. Content items are stored in a hierarchical view, similar to file folders in an electronic filing system on a PC, for example. A MediaRenderer (MR) on the network plays back the AV content stored at the MSs.

As to selecting and playing back a content item (still picture, video, audio, etc.) on a UPnP AV network, the MS, MR and CP typically interact with one another as follows. The user uses the UPnP AV CP to browse content on the MS. Here, every item is shown in its organizational context, having a relationship with other items or clusters of items, not unlike a directory structure. The CP can determine the logical parent, siblings, etc., of a particular item and retrieve information about these. Once the user has selected a particular item to be rendered on the MR, the CP selects a suitable resource representing the item in a particular format and forwards to the MR a pointer, referred to as a "Uniform Resource Identifier", or URI, and pointing to the resource. A URI is a type of formatted identifier that encapsulates the name of an (Internet) object, and labels it with an identification of the name space, thus producing a member of the universal set of names in registered name spaces and of addresses referring to registered protocols or name spaces. As a result of the way UPnP AV has been defined, this URI has lost the logical context that exists in the MS structure. That is, it is not possible anymore to determine parent, siblings etc. The MR uses this URI as supplied in order to render the item.

A ConnectionManager (CM) in UPnP is a service-type that enables modeling of streaming capabilities of AV devices, and binding of those capabilities between devices. Each device that is able to send or receive a stream according to the UPnP AV device model has one instance of the CM service. This service provides a mechanism for CPs to: perform capability matching between source/server devices and sink/renderer devices; find information about currently ongoing transfers in the network; and setup and teardown connections between devices. The CM service properly abstracts different kinds of streaming mechanisms, such as HTTP-based streaming, RTSP/RTP-based and 1394-based streaming. The CM enables CPs to abstract from physical media interconnect technology when making connections.

The AV Transport (AVT) service in UPnP provides actions that allow a CP to control the flow of the content. This includes operations such as Play, Stop, Pause, Seek, etc. A CP uses the AVT to identify the content that is to be played. This is accomplished by forwarding the URI, obtained from the CDS for the desired content and the selected protocol and format. Dependent on the protocol for transfer of the content, either the MS or the MR may provide an instance of the AVT service. If the selected protocol is a "pull" model (e.g., HTTP GET), then the MR is required to provide an instance of AVT to control the flow of the content (e.g., play, pause, seek). If the selected protocol is a "push" model, then the server must provide an instance of AVT.

While the UPnP Architecture describes, and prescribes, many aspects of devices that are required for a certain level of interoperability, it does not describe anything related to streaming between devices. The purpose of the CM service is to make these aspects of devices explicit, so that CPs are able to make intelligent choices, present intelligent user interfaces, and initiate (and terminate) streams between controlled devices via UPnP actions. While the actual stream of the data packets occurs outside of a UPnP-defined protocol such as SOAP, SOAP is used to initiate (and terminate) the stream.

The CM service defines the notion of "ProtocolInfo" as information needed by a CP in order to determine compatibility between the streaming mechanisms of two UPnP controlled devices. For example, it contains the transport protocols supported by a device, for input or output, as well as other information such as the content formats (encodings) that can be sent, or received, via the transport protocols. Note that UPnP prescribes the use of HTTP for controlling devices via SOAP, but that UPnP does not require HTTP to be used for all kinds (Audio and Video) streaming in a UPnP network. In UPNP, ProtocolInfo specifies the network and the protocol to be used for rendering a content item The term "ProtocolInfo" is used to describe a string formatted as:

<protocol>':'<network>':'<contentFormat>':'<additionalInfo> wherein each of the four elements may be a '*', or wildcard. CPs can match protocol info by string comparison operations on the <protocol>, <network> and <contentFormat> elements, taking into account the '*' wildcard, which 'matches' with anything. The <additionalInfo> part does not need to match between MS and MR. Its purpose is to convey any additional information needed to set up the out of band stream (e.g., 1394 addresses).

A CP and an MS can be physically combined within a single device, referred to as a "combo" device. Examples of an MS are, a video recorder, a DVD player, a CD player, a digital camera or camcorder, a TV tuner, a settop box, a PC. Examples of an MR are a TV display monitor, speakers, a PC, an MP3 player, etc. Each device that is able to send or receive a stream of data according to the UPnP AV device model comprises one instance of a Connection Manager service (CM). A CM provides a mechanism for CPs to perform capability matching between MS devices and MR devices; to find information about transfers on the network currently ongoing; and to initiate and terminate connections between devices. The CM thus enables CPs to abstract from physical media interconnect technology when making connections.

SUMMARY OF THE INVENTION

A problem is that the MR cannot determine what the next item is to be rendered. The MR is only given one pointer to a resource and once that is done playing, the CP must hand it a new item to be rendered. This requires the continuous presence of a CP on the network. A typical solution, suggested by the UPnP AV specs., is to add a playlist to the Media Server. This restores some context for a particular item, typically specifying a sequential list of items.

The UPnP AV specifications already describe how to retrieve a context for AV content items related to the manner wherein the Content Directory Service (CDS) is specified. The CDS exposes the AV content available from the MS and allows CPs to discover information about the AV content. As to the CDS, many devices on the home network contain various types of content that other devices can access. In order for the user to enjoy this content, he/she must be able to browse the objects stored on the MS, select a specific one, and cause it to be played out at an appropriate rendering device. It is highly desirable to allow the user to initiate these operations from a UI device. In most cases, these UI devices are either a UI built into the rendering device, or are stand-alone UI devices such as a wireless PDA or tablet. In any case, it is unlikely that the user interacts directly with the device containing the content. In order to enable this capability, there is a need to provide a uniform mechanism for UI devices to browse the content on the MS and to obtain detailed information about individual content objects. This is the purpose of the CDS. In addition, the CDS provides a lookup/storage service that allows clients (e.g., UI devices) to locate, and possibly store, individual objects that the MS is capable of providing. For example, the CDS can be used to enumerate a list of songs stored on an MP3 player, a list of still-images comprising various slide-shows, a list of movies stored in a DVD Jukebox, a list of TV shows currently being broadcast supplied as an EPG, a list of songs stored in a CD Jukebox, a list of programs stored on a PVR (Personal Video Recorder), etc. Nearly any type of content can be enumerated via the CDS.

The inventors now propose to enable a MR-CP combination device to automatically playback content items using the organizational context of the items residing at the CDS.

More specifically, the invention relates to a method of enabling a UPnP-compliant MediaRenderer-Control Point combination to use an organizational context of a content item as represented in a UPnP Content Directory Service, i.e., in the service implementing the browsing capability at the MS. The method comprises enabling the combination to receive a URI representative of the Content Directory Service. Preferably, the method comprises enabling the combination to receive the URI together with an objectID representative of the content item, e.g., the item initially selected by the user in the conventional manner through a CP. The content item associated with the objectID provides a reference for the context, e.g., a reference from which to determine what is the logically next (or previous) content item. The method further comprises providing a ProtocolInfo string referring to the content item and the organizational context for enabling the combination to retrieve a further URI representative of the content item for being streamed using a streaming protocol.

The CDS description URI enables a CP to retrieve all necessary information to browse the MS. The MR now uses its built-in CP and the information embedded in the URI to contact the MS and to retrieve the necessary information about the selected content item as represented by the objectID. Through its CP, the MR can now retrieve the full context of the selected item and browse the parent, children, etc., of the item. At this point, the CP local to the MR takes over and controls the playing back of the requested item as it would if the playback had been initiated by the user through the local controls of the device's CP. When the MR is requested to retrieve and play out the logically next content item, e.g., manually by the user or through the local controls of the MR-CP combination device or through any external CP acting on the MR, the MR uses its built-in CP again to retrieve the relevant item. Similarly, the MR can be instructed to play out items at random, chronologically or alphabetically, etc., using its built-in CP and suitable control software to exploit the organizational context.

The UPnP AV specification allows for vendor-specific extensions that enable a company to differentiate its products from those of its competitors. Therefore, the CDS description URI preferably implements a proprietary protocol, identified in UPnP by means of the ProtocolInfo string. In UPnP, ProtocolInfo specifies the network and the protocol to be used in order to render the content item. In the invention, ProtocolInfo refers to the retrieval of the selected content item within its organizational context. Using this context, the MR-CP combination device can select an actual URI and an actual protocol.

A further implementation of the invention relates to an electronic device comprising a UPnP-compliant MediaRenderer-Control Point combination configured to exploit an organizational context of a content item as represented in a UPnP Content Directory Service, the device being configured to process a URI representative of the Content Directory description, preferably together with an objectID of the content item. Preferably, the combination is configured to process the content item as streamed according to a proprietary protocol.

Another implementation of the invention relates to control software for installation on a UPnP-compliant MediaRenderer-Control Point combination for enabling the MediaRenderer to exploit an organizational context of a content item as represented in a UPnP Content Directory Service. The software is configured to process a URI representative of the Content Directory description, preferably together with an objectID of the content item.

Accordingly, the invention adds a special URI and a protocol, preferably proprietary, to an MS or a CP. An MR-CP combination device is enabled to interpret this URI in close cooperation between the MR and the CP of the combination device. The MR-CP combination device re-uses the CDS interface in order to invoke actions on a context of a content item as represented in the CDS. The approach of the invention can be used to, e.g., replace the playlist functionality in UPnP. The invention also enables a user to determine the content item from any CP, e.g., browsing back based on the information in the MR-CP combination device, to the location of the content item in the organization as represented in the CDS. Furthermore, the invention enables the CP in the MR-CP combination device to select a more suitable resource in the CDS on the basis of the capabilities of the MR and the CDS as represented in the information in the UPnP Directory, and more detailed information on the exact capabilities of the MR-CP combination device. This selection is normally carried out by the external CP based on less information than is available to the MR-CP combination device itself. For example, the MR-CP combination device may choose a resource with a graphical resolution better suited to the device's rendering capabilities. An external CP can typically not obtain enough information through UPnP in order to make such a choice.

BRIEF DESCRIPTION OF THE DRAWING

The invention is explained in further detail, by way of example and with reference to the accompanying drawing wherein.

Throughout the figures, same reference numerals indicate similar or corresponding features.

DETAILED EMBODIMENTS

Figure 1:
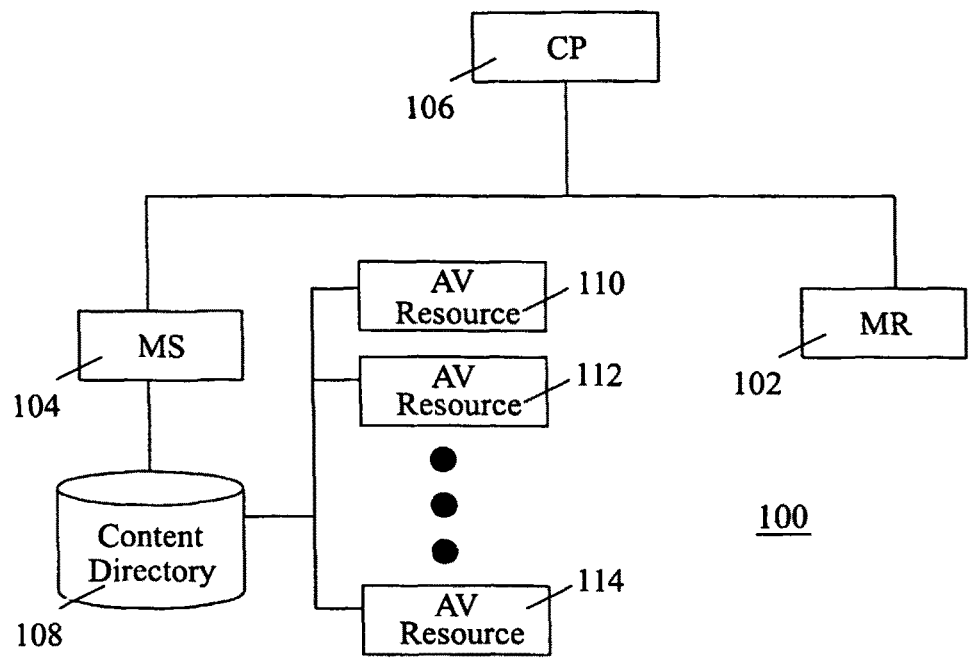
FIG. 1 is a block diagram of a conventional UPnP AV system.

FIG. 1 is a block diagram of a conventional UPnP AV system 100, e.g., a home network. System 100 comprises an MR 102, an MS 104 and an AV CP 106. MR 102 is a device or service that is capable of rendering electronic content, such as a still picture, a video clip, an audio file, etc. MS 104 is a device for storing content and exposing this to other devices or services on network 100. CP 106 is operative to locate MSs, e.g., MS 104, and MRs, e.g., MR 102 on network 100. CP 106 is operative to invoke actions on MR 102 and MS 104. More specifically, MS 104 cooperates with MR 102 to allow CP 106 to discover AV content (e.g., video, audio, images, etc) on MS 104 and to have that content rendered on MR 102. First, CP 106 discovers MS 104 and MR 102 on network 100. CP 106 contacts MS 104 to locate a desired piece of content, e.g., a song, a playlist, a movie, etc. After the content has been identified, CP 106 determines a transfer protocol and a data format to transfer the content from MS 104 to MR 102. Then CP 106 controls the transfer of the content through actions such as Play, Pause, Stop, etc. The actual transfer of the content takes place under control of MS 104 and MR 102, independently of CP 106 and of UPnP. CP 106 uses UPnP to set-up the transfer of the content, but the transfer uses a protocol other than UPnP.

On network 100, content items are stored in a hierarchical view, similar to folders in an electronic file system. As to this hierarchical view, a UPnP AV Content Directory Service (CDS) 108 enumerates content available through the associated MS 104 from resources 110, 112, . . . , 114. CDS 108 exposes a class hierarchy, which is used to identify all objects that can be retrieved from it. Each class is named using a string with a pre-defined syntax. Each class definition includes a list of properties. Some properties are required while others are optional. Some properties are "multi-valued" for a class, meaning that, in an XML instance of the class, the property may occur more than once. A class that is derived from another class must include all the required properties of the base class. The definition of a subclass may make some optional properties of the base class required. Each property will be expressed in XML as either an XML Element or XML Attribute.

Through CP 106 a user of network 100 has access to an inventory of the content available from MS 104 as presented by CDS 108 in an organized manner. That is, an organizational context of a content item is accessible to CP 106. When the user selects a particular content item for being rendered at MR 102, CP 106 forwards to MR 102 a pointer to this particular item. This pointer is commonly referred to as a Uniform resource Identifier (URI). MR 102 then uses this URI to retrieve this item from MS 104. This URI does not contain any contextual or organizational information anymore, representative of the item in CDS 108. Accordingly, for MR 102 to be able to render a next item after completion of the rendering of the current item, CP 106 is to forward a next URI. This, however, requires that CP 106 be functionally present all the time. The UPnP specs allow for playlists at MS 104 so that a collection of content items is available for being rendered sequentially without intervention of CP 106 during the processing of the playlist. The playlist itself then has its own URI.

Figure 2:
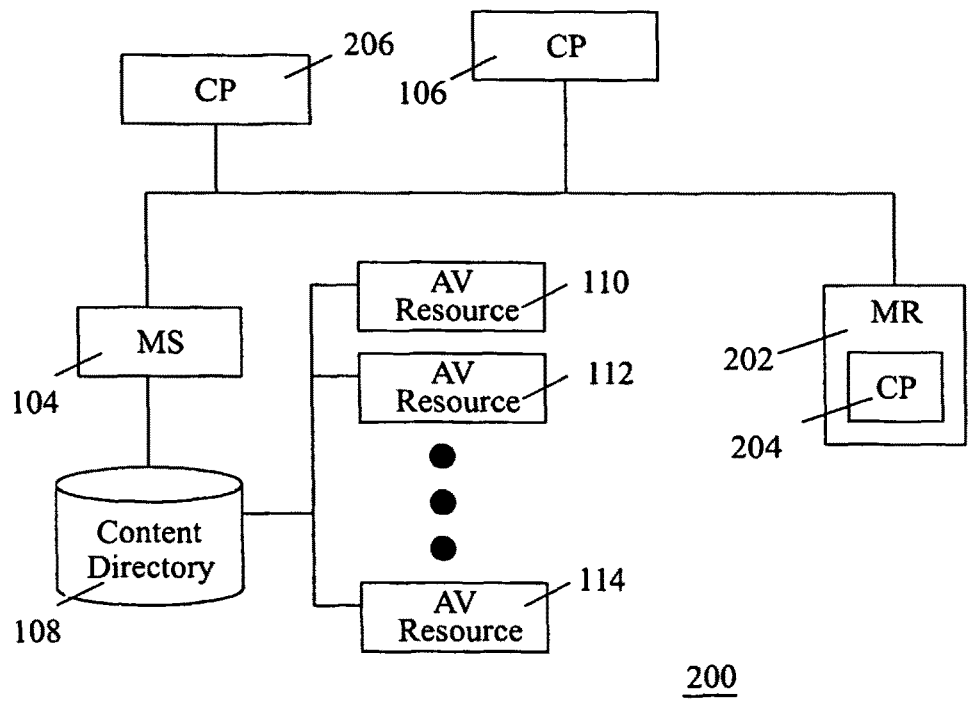
FIG. 2 is a block diagram of a UPnP AV system in the invention.

FIG. 2 is a block diagram of a UPnP system 200 according to the invention. With respect to FIG. 1, a major difference resides in system 200 now having a MR 202 that also accommodates at least part of the functionality 204 of a UPnP CP. For example, MR 202 is an MR-CP combination device. Operation is as follows. As in system 100, the user is enabled to browse CDS 108 via CP 106 and to select a particular content item for rendering at MR 202. In system 200 according to the invention, selection of a particular content item results in CP 106 forwarding to MR 202 a special URI. The special URI comprises the identifier, or objectID, of the content item selected but, in addition, comprises the URI of CDS 108. As noted earlier, CDS 108 is the service that implements the features required for browsing MS 104. The syntax of the special URI is <CDS service description URI>?<objectID>. In general, the CDS service description URI allows a CP to retrieve all information from an MS that is needed to support browsing.

CP106 determines that MR 202 can render this special URI by means of the regular mechanisms as defined in UPnP AV. MR 202 announces, in its supported protocols, a string known as ProtocolInfo (see above) that identifies this type of URI (or more precisely, this type of protocol). The special URI represents a vendor specific protocol.

MR 202 now uses its built-in CP 204 and the information embedded in the special URI to contact MS 104 for retrieval of the information about the selected item. Upon retrieval thereof, CP 204 is capable of acquiring the full context and is capable of browsing the parents and siblings of the selected item. At this point, CP 204 is used by MR 202 and handles the playing out of the selected content item as if the playing out had been initiated by a user through the local controls of CP 204. CP 204 handles the remainder of the playback logic from now on. CP 106 can, but does not need to, remain on network 200. It is kept informed of the state of MR 202 and consequently of any further actions taken by CP 204, through the normal mechanisms defined in UPnP AV. The user can use either CP 106 or CP 204 to trigger further actions on MR 202. So, if MR 202 receives a request, be it from GP 106 or CP 204, e.g., to play out at random more items of the container to which belongs the item first selected, or to play a next item or a previous item, etc., according to the organization in CDS 108, MR 202 uses its CP 204 again to retrieve the relevant items from MS 104.

The invention allows adding this automatic, context-driven play out functionality to an existing UPnP network in a simple manner. AV CP 204 is to be integrated with MR 202. MS 104 is modified by means of adding an extra URI to its list of resources. If MS 104 does not support this modification, external CP 106 can create such an URI according to the invention and forward that to MR 202.

Note that after CP 106 has passed on the control to CP 204, CP 106 does not need to interact anymore with MR 202. CP 204 is then self-sufficient with regard to selecting the next (or previous or etc.) content item. The user, however, can still keep using CP 106 in order to request MR 202 to play out the logically next item. It is sufficient that CP 106 sends a "Next" request to MR 202, the latter then using CP 204 in order to determine what the next item actually is.

Further, the combination of MR 202 and CP 204 allows the user to continue to browse where he/she left off at external CP 106. The information in the special URI can be used to present to the user the context of the item previously selected, i.e., a view on the directory structure of the CDS, as it was at the moment the item was selected for playback at MR 202.

System 200 also comprises an additional CP 206. As discussed above, CP 106 was used to initiate the playback of the selected content item, indicated by the objectID in the special URI that also contained the URI of CDS 108. Using the special URI and the ProtocolInfo string, CP 206 is enabled as well to retrieve the context of the selected content item. In order to do this, CP 206 sends a request to MR 202 via the CM service and AVT service. According to the invention, therefore, CP 206 is enabled to regenerate the context of a content item being played out at MR 202. This can be used in the scenario wherein the user of network 200 moves between different CPs.

The invention claimed is:

1. A method of enabling a UPnP-compliant MediaRenderer-Control Point combination to use an organizational context of a first content item as represented in a UPnP Content Directory Service, the method comprising causing the combination to:
   receive a URI representative of a Content Directory Service (CDS) description;
   retrieve, based on the URI, the CDS description;
   process the CDS description to determine the organizational context of the first content item; and
   render a second different content item based on the organizational context of the first content item.

2. The method of claim 1, comprising enabling the combination to receive the URI together with an objectID representative of the content item.

3. The method of claim 1, comprising providing a ProtocolInfo string referring to the first content item and the organizational context for enabling the combination to retrieve a further URI representative of the second content item for being streamed using a streaming protocol.

4. The method of claim 3, wherein the streaming protocol is proprietary.

5. An electronic device comprising a UPnP-compliant MediaRenderer-Control Point combination configured to exploit an organizational context of a first content item as represented in a UPnP Content Directory Service, the device being configured to:
   receive a URI representative of a Content Directory Service (CDS) description;
   retrieve, based on the URI, the CDS description;
   process the CDS description to determine the organizational context of the first content item; and
   render a second different content item based on the organizational context of the first content item.

6. The device of claim 5, configured to process an objectID, representative of the content item, together with the URI.

7. The device of claim 5, configured to process a ProtocolInfo string referring to the first content item and the organizational context for enabling the combination to retrieve a further URI representative of the second content item for being streamed using a streaming protocol.

8. The device of claim 7, configured to implement the streaming protocol that is proprietary.

9. A non-transient computer-readable medium comprising control software for installation on and execution by a UPnP-compliant MediaRenderer-Control Point combination for enabling the MediaRenderer to exploit an organizational context of a first content item as represented in a UPnP Content Directory Service, the software being configured to cause the combination to:
   receive a URI representative of a Content Directory Service (CDS) description;
   retrieve, based on the URI, the CDS description;
   process the CDS description to determine the organizational context of the first content item; and
   render a second different content item based on the organizational context of the first content item.

10. The medium of claim 9, wherein the software is configured to cause the combination to process an objectID, representative of the content item, together with the URI.

11. The medium of claim 9, wherein the software is configured to cause the combination to process a ProtocolInfo string referring to the content item and the organizational context for enabling the combination to retrieve a further URI representative of the second content item for being streamed using a streaming protocol.

12. The medium of claim 11, wherein the software is configured to cause the combination to implement the streaming protocol that is proprietary.

13. A device comprising:
a UPnP interface;
a renderer that is configured to render content received from at least one media server; and
a controller that is configured to control reception of the content from the media server;
wherein:
the controller is configured for
receiving a URI via the UPnP interface from an external UPnP Control Point,
receiving, based on the URI, a content directory from the media server that provides an organizational context of an item of the content at the media server, and
controlling selection of at least one subsequent item of the content based on the content directory.

14. The device of claim 13, wherein the controller is configured as an other UPnP Control Point.

15. The device of claim 13, wherein the content directory corresponds to a UPnP Content Directory Service.

16. The device of claim 13, wherein the controller is configured to automatically select the subsequent item of the content upon conclusion of rendering the item.

17. The device of claim 16, wherein the controller automatically selects the subsequent item based on a random selection from a plurality of items identified in the content directory.

18. The device of claim 16, wherein the controller automatically selects the subsequent item based on a logical order of a plurality of items identified in the content directory.

19. The device of claim 13, wherein the controller is configured to receive the URI together with an identifier of the item for rendering the item.

20. The device of claim 13, wherein the controller is configured to receive a UPnP Protocol Info string that refers to the item and the organizational context to facilitate receiving the item from the media server.

21. A method for execution on a UPnP media renderer comprising:
receiving an identification of a content item at a media server to be rendered, and a URI corresponding to a context of the content item within the media server, from an external controller,
receiving the content item from the media server based on the identification,
receiving the context of the content item based on the URI,
rendering the content item at the UPnP media renderer,
determining a subsequent content item at the media server to be rendered, based on the context, and
receiving and rendering the subsequent content item.

22. The method of claim 21, wherein the URI identifies a UPnP Content Directory Service description.

23. The method of claim 21, wherein the external controller corresponds to a UPnP Control Point.

24. The method of claim 21, wherein the context corresponds to a content directory at the media server.

25. The method of claim 24, wherein the determining of the subsequent content item is based on a random selection from a plurality of content items identified in the content directory.

26. The method of claim 24, wherein the determining of the subsequent content item is based on a logical order of a plurality of items identified in the content directory.

* * * * *